(12) United States Patent
McMullen, Sr.

(10) Patent No.: US 6,227,510 B1
(45) Date of Patent: May 8, 2001

(54) HAND-SIZE CONTAINER HOLDER

(76) Inventor: Donald A. McMullen, Sr., 344 Center Rd., Monroeville, PA (US) 15146

( * ) Notice: Subject to any disclaimer, the term of this patent is extended or adjusted under 35 U.S.C. 154(b) by 0 days.

(21) Appl. No.: 09/345,271

(22) Filed: Jun. 16, 1999

(51) Int. Cl.[7] .................................................. F16M 13/02
(52) U.S. Cl. ..................................... 248/311.2; 248/230.5
(58) Field of Search .......................... D7/620; 248/311.2, 248/312.1, 313, 903, 230.5, 230.7, 231.61, 231.81, 227.3, 229.14, 229.16, 229.24; 220/741, 737, 742

(56) References Cited

U.S. PATENT DOCUMENTS

| | | | |
|---|---|---|---|
| D. 401,121 | * 11/1998 | Hartmann et al. | D7/620 |
| 2,936,149 | * 5/1960 | Reeg | D7/620 |
| 4,270,724 | 6/1981 | McMullen | 248/534 |
| 4,513,923 | * 4/1985 | Ulics | 248/230.5 |
| 4,795,211 | * 1/1989 | Stern et al. | 248/311.2 |
| 4,826,058 | * 5/1989 | Nakayama | 248/311.2 |
| 5,813,646 | * 9/1998 | Bartholomae | 248/311.2 |
| 5,848,722 | * 12/1998 | Hanes | 220/741 |
| 5,853,158 | * 12/1998 | Riggle | 248/311.2 |
| 5,865,412 | * 2/1999 | Mason | 248/311.2 |
| 5,913,452 | * 6/1999 | Weigl | 248/311.2 |
| 5,984,136 | * 11/1999 | Mason | 220/737 |
| 6,059,138 | * 5/2000 | Labruyere | 220/737 |

OTHER PUBLICATIONS

Sit 'n Fish device (packaging literature/illustration and photographs of the device).

* cited by examiner

Primary Examiner—Ramon O. Ramirez
Assistant Examiner—Jon Szumny
(74) Attorney, Agent, or Firm—Metz Schermer & Lewis, LLC; Thomas Lizzi

(57) ABSTRACT

A holder for a hand-size container for use in conjunction with a portable chair. The holder comprises an integral body portion and a clamping means for attaching the holder to the portable chair. The integral body portion consists of an annular band having an inside diameter sized to receive a hand-held container, first and second arcuate legs, and a horizontal double-beam-flange member which cooperate to securely and removably hold and support a container placed within the annular band. The annular band may include a discontinuity to accommodate the passage through the annular band of a protruding part of the container, for example, a cup handle. The clamping means is affixed to an end of the horizontal double-beam-flange member so as to provide a means for removably attaching the holder to a portable chair. In some embodiments of the present invention, the affixation of the clamping means to the integral body portion is by way of a part of the clamping means being an integral part of the integral body portion of the holder. In other embodiments, the clamping means is affixed to the proximal end of the horizontal flange member by way of a mechanical fastener.

1 Claim, 5 Drawing Sheets

HAND-SIZE CONTAINER HOLDER

FIELD OF INVENTION

The present invention relates to a holder for a hand-sized container. More specifically, the present invention relates to a holder for hand-size containers for use in conjunction with a portable chair.

BACKGROUND OF THE INVENTION

There are many times when a person who is seated in a portable chair, such as a lawn or patio chair or a wheelchair, needs a place to set down a hand-size container the person is holding but no suitable place is within convenient reach. Such hand-held containers may hold a beverage, medicine, or some other liquid, food or small objects, for immediate use by the person. It is important that whatever the person places the container onto or into to free up the use of his hands keeps the container reasonably secure from spilling its contents. It is also important that the person's access to the container is not impaired and that he be able to set down and recover the container without difficulty. The problem of where to put such a container is exacerbated by the movable nature of a portable chair because circumstances may necessitate the relocation of the portable chair after the person has been seated. This problem is particularly acute when the portable chair is a wheelchair which may be moved from one place to another while the person remains seated.

Also, portable chairs may be used in congested areas where seating density or pedestrian traffic is high. Therefore, it is important that the size of whatever the container is placed onto or into be small so as to avoid interference with surrounding chairs or traffic. McMullen, U.S. Pat. No. 4,270,724 describes a holding device for use in conjunction with a portable chair that may be used to hold a hand-size container. However the holding device described in McMullen is unsuitably large, having as it does, in addition to means for holding a hand-size container, extra length to accommodate the attachment of other devices such as an ashtray or a fishing rod holder.

Furthermore, because of the low cost of many portable chairs, it is desirable that whatever is provided for the purpose of holding a hand-size container be inexpensive. Due to the portable nature of portable chairs and the fact that most portable chairs are also collapsible for transport and storage, it is desirable that whatever is provided for holding such a container also be light-weight and, if it is attachable to the chair, that it be easy to attach and detach. Additionally, any holder that is attachable to a portable chair should have sufficient strength to be resistant to sagging under the weight of a hand-sized container so as to avoid spilling the contents of the container, especially when the container is open-topped and full of a liquid.

SUMMARY OF THE INVENTION

It is an object of the present invention to provide a holder that can securely hold a hand-size container within convenient reach of a person who is seated in a portable chair such as a lawn or garden chair or a wheelchair.

It is another object of the present invention to provide a container holder that can be easily attached to and detached from a portable chair.

It is another object of the present invention to provide a container holder that is no larger than is necessary for holding the hand-size container so that the portable chair may be used in congested areas where seating density or pedestrian traffic is high.

It is another object of the present invention to provide a container holder that is inexpensive.

It is another object of the present invention to provide a container holder that is light-weight.

It is another object of the present invention to provide a container holder that is resistant to sagging under the weight of a hand-held container.

The present invention accomplishes all of these objects by providing a holder for a hand-size container for use in conjunction with a portable chair wherein the holder comprises an integral body portion and a clamping means for attaching the holder to a portable chair. The integral body portion consists of an annular band having an inside diameter sized to receive a hand-held container, first and second arcuate legs, and a horizontal double-beam-flange member having a top surface, a distal end, and a proximal end, the arcuate legs depending downwardly from the annular band to spatially separate the annular band from the horizontal flange member, the first arcuate leg intersecting the top surface of the horizontal flange member adjacent to the distal end of the horizontal double-beam-flange member and the second arcuate leg intersecting the top surface of the horizontal double-beam-flange member at a preselected distance from the proximal end of the horizontal flange member such that the annular band, the arcuate legs, and a portion of the top surface of the horizontal double-beam-flange member located between the arcuate legs cooperate to securely and removably hold and support a container placed within the annular band.

The clamping means is affixed to the proximal end of the horizontal double-beam-flange member so as to provide a means for removably attaching the integral body portion to a portable chair. In some embodiments of the present invention, the affixation of the clamping means to the integral body portion is by way of a part of the clamping means being integral to the integral body portion of the holder. In other embodiments, the clamping means is affixed to the proximal end of the horizontal double-beam-flange member by way of a mechanical fastener.

The present invention also includes embodiments in which the annular band is discontinuous wherein the discontinuity accommodates a protruding portion of a hand-sized container. For example, the discontinuity in the annular band may accommodate the passage of the handle of a coffee cup through the annular band to allow the holder to receive and securely hold the coffee cup.

These and other features and advantages inherent in the subject matter claimed and disclosed will become apparent to those skilled in the art from the following detailed description of presently preferred embodiments thereof and to the appended drawings.

BRIEF DESCRIPTION OF THE DRAWINGS

The drawings are provided only as an aid in understanding the operation of the present invention. It is to be understood, therefore, that the drawings are provided solely for the purpose of illustration and not as a definition of the limits of the present invention.

DETAILED DESCRIPTION OF PREFERRED EMBODIMENTS

Figure 1:
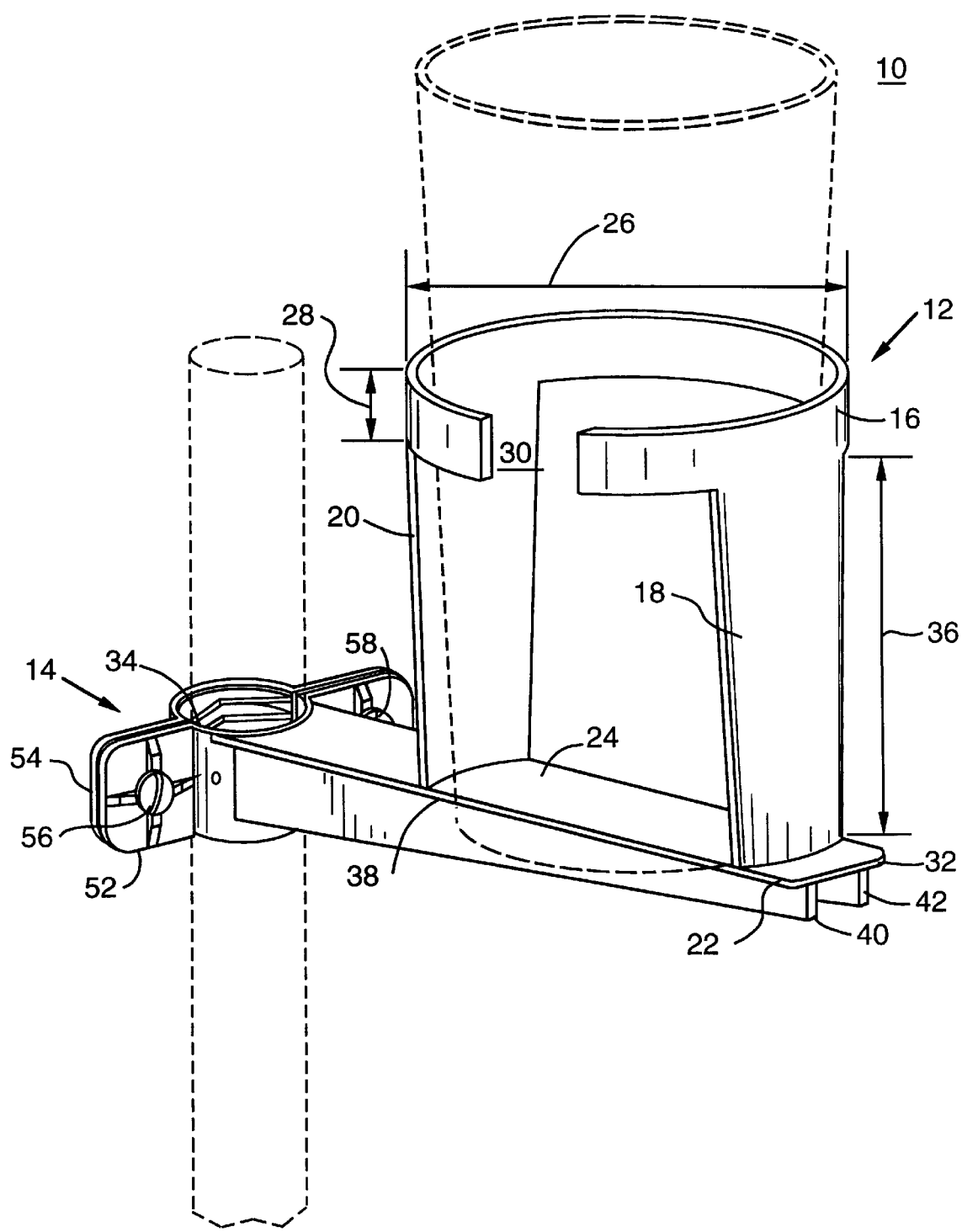
FIG. 1 is a perspective side view of a container holder according to a first embodiment of the present invention.

A preferred first embodiment of a hand-size container holder according to the present invention is shown in FIG. 1. Referring to FIG. 1, holder 10 consists of an injection-molded polypropylene integral body portion 12 adapted to holding a hand-size container and a clamping means 14 for removably attaching holder 10 to a portable chair.

Integral body portion 12 is a monolith consisting several component features. Integral body portion 12 consists of annular band 16, diametrically-opposed first and second arcuate legs 18, 20, and horizontal double-beam-flange member 22. Annular band 16, first and second arcuate legs 18, 20 and double-beam-flange member 22 cooperate to securely and removably hold and support a hand-sized container that is inserted into annular band 16. Preferably, the cooperation of these components is such that the bottom surface of the container rests upon top surface 24 of horizontal double-beam-flange member 22 and is laterally restrained by annular band 16.

Annular band 16 has inside diameter 26 sized to receive a hand-held container. Preferably, inside diameter 26 is about 3⅛ inches so as to receive a conventional beverage can having a 12 fluid ounce capacity. Annular band 16 also has width 28 sufficient to provide annular band 16 with sufficient stiffness and strength so that annular band 16 maintains its circular shape during service. Preferably, width 28 is about ⅝ inches. Optionally, annular band 16 contains discontinuity 30 to accommodate the passage through annular band 16 of a protruding part of a container, for example, the handle of a coffee cup. Preferably, the outer circumferential length of discontinuity 30 is about one inch.

First and second arcuate legs 18, 20 depend downwardly from annular band 16 and intersect top surface 24 of horizontal double-beam-flange member 22. First and second arcuate legs 18, 20 are located in diametrical opposition to each other across annular band 16. The inside radius of first and second arcuate legs 18, 20 is substantially the same as the inside radius of annular band 16. First arcuate leg 18 intersects top surface 24 of horizontal double-beam-flange member 22 adjacent to horizontal double-beam-flange member distal end 32. Second arcuate leg 20 intersects top surface 24 of horizontal double-beam-flange member 22 at a preselected distance from horizontal double-beam-flange member proximal end 34. Preferably this preselected distance is short so as to minimize the distance the holder protrudes from the portable chair to which it is attached thereby minimizing the chance of holder 10 interfering with other chairs, objects or traffic in the vicinity of the portable chair to which it is attached. Preferably, the preselected distance is no more than about two inches.

First and second arcuate legs 18, 20 spatially separate annular band 16 from horizontal double-beam-flange member 22 by a distance 36 which is sufficiently long to allow annular band 16 to restrain a container inserted into annular band 16 from toppling over. Preferably, distance 36 is about two inches. The outer secantial width of first and second arcuate legs 18, 20 where they meet the top surface 24 of horizontal double-beam-flange member 22 is substantially the same as the width of horizontal flange 38. Preferably, first and second arcuate legs 18, 20 are tapered so that their outer secantial width is greater where they intersect annular band 16 than it is where they intersect the top surface 24 of horizontal double-beam-flange member 22. Where holder 12 is sized to accommodate a conventional beverage can having a 12 fluid ounce capacity, the outer secantial width of first and second arcuate legs 18, 20 where they intersect annular band 16 is about 1 3/16 inches and about 1 inch where they intersect top surface 24.

Figure 2:
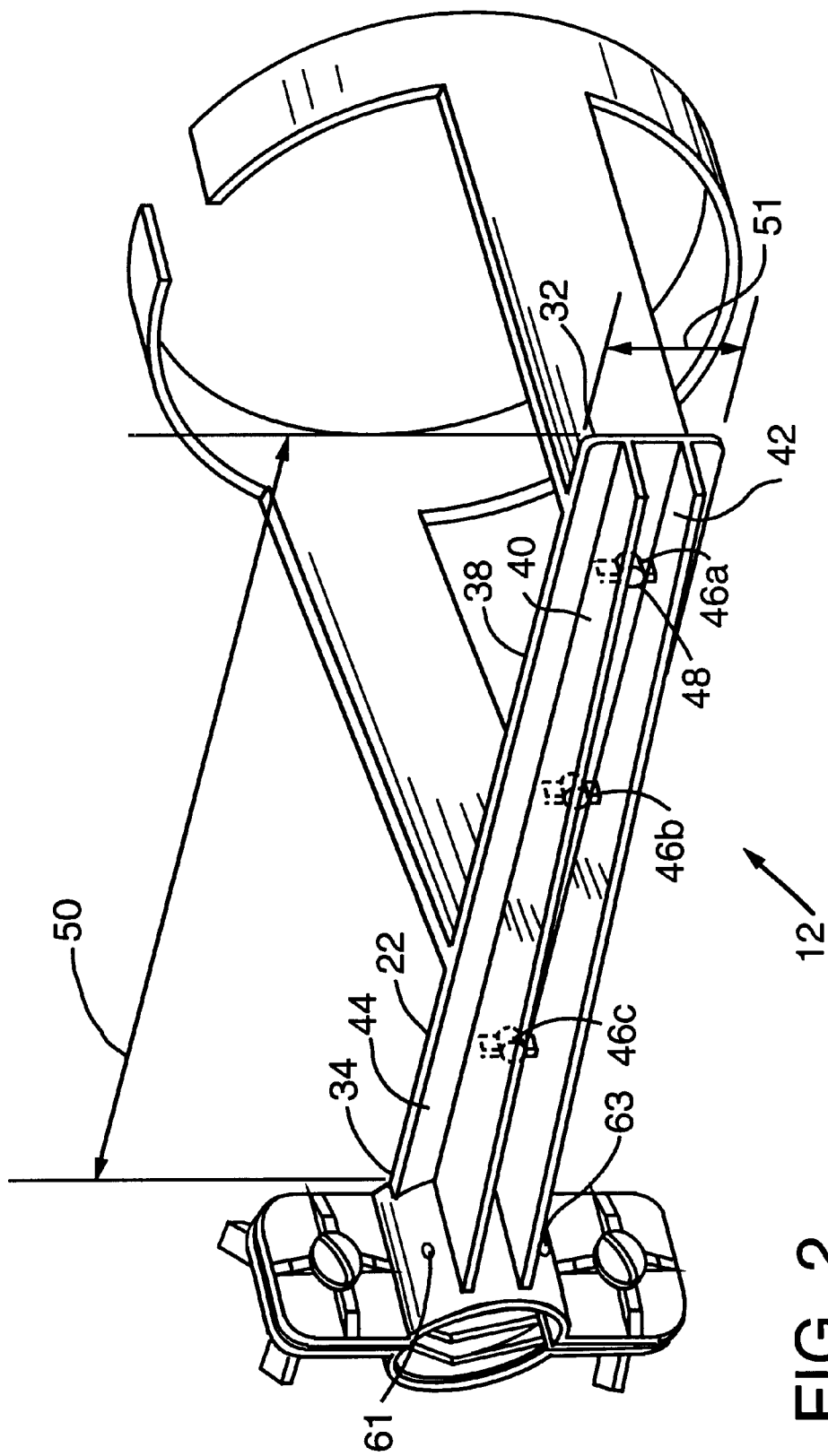
FIG. 2 is a perspective bottom view of a container holder according to a first embodiment of the present invention.

Horizontal double-beam-flange member 22 includes horizontal flange 38 and first and second beams 40, 42. Referring to FIG. 2, first and second beams 40, 42 are coparallel and depend downwardly from bottom surface 44 of horizontal flange 38. Preferably, first and second beams 40, 42 taper in width, i.e. the distance each depends downwardly from the bottom surface 44 of horizontal flange 22, from a maximum at the proximal end 34 horizontal double-beam-flange member 22 to a minimum at the distal end 32 of horizontal double-beam-flange member 22. Optionally, horizontal double-beam-flange member 22 also includes one or more connecting ribs 46a–c which depend downwardly from the bottom surface 44 of horizontal flange 38 and connect first and second beams 40, 42 so as to enhance the torsional stiffness of horizontal double-beam-flange member 22. The width of each of connecting ribs 46a–c, i.e. the distance it depends downwardly from the bottom surface of horizontal flange 22, is selected so that the connecting rib width is no greater than, and preferably less than, the width of first and second beams 40, 42 where the connecting rib connects to these beams. Optionally, connecting ribs 46a–c may include a gate remnant, such as gate remnant 48, remaining from a gate which was used in injecting the polypropylene into the mold during the injection molding of integral body portion 12.

Horizontal double-beam-flange member 22 provides vertical support to the container. The component parts of horizontal double-beam-flange member 22 are sized to support the container without substantial sagging of the horizontal double-beam-flange member under the weight of the container and its contents. Thus, the sizes of these components depend on the size and weight of the container and its contents that is to be held by holder 12. For example, where holder 12 is designed to hold a conventional beverage can having a 12 fluid ounce capacity, horizontal double-beam-flange member 22 preferably has an overall length 50 of about 5½ inches, horizontal flange 38 has a width 51 of about 1 inch, first and second beams 40, 42 have widths tapering from about ⅞ inches to about ⅜ inches and are spaced apart by about ⅜ inches, connecting ribs 46a–c have widths of about ¼ inches, and the thicknesses of horizontal flange 38 and first and second beam 40, 42 are all about ⅛ inches.

Referring to FIG. 1, clamping means 14 in this embodiment of the present invention is partially integral with integral body portion 12. Clamping means 14 consists of integral bracket-half 52, mating bracket-half 54, and first and second fasteners 56, 58. These elements cooperate to enable clamping means 14 to securely and removably attach holder 10 to a portable chair with first and second fasteners 56, 58 holding integral bracket-half 52 and mating bracket-half 54 opposingly in clamping contact with a structural member of the portable chair. A structural member of a portable chair is any component of the portable chair which has sufficient strength and stiffness and is of suitable size to support a holder embodiment of the present invention in an orientation desired by the user of the holder.

First and second fasteners 56, 58 preferably comprise materials which resistant to aqueous corrosion. Examples of such materials include, but are not limited to, nylon and stainless steel. First and second fasteners 56, 58 may be any type of fastener known to one skilled in the art which is capable of holding integral bracket-half 52 and mating bracket-half 54 opposingly in clamping contact with a structural member of the portable chair securely enough for holder 12 to support a hand-size container. First and second fasteners 56, 58 are preferably of a type of fastener that does not require the use of tools for installation and that allows for easy attachment or detachment of the holder to a portable chair in less than two minutes. Preferably, first and second fasteners 56, 58 will each consist of a threaded shank portion, such as a bolt, and a nut. More preferably, the nut is a wing nut. First and second fasteners 56, 58 are preferably the same type of fastener but may be of different types. Preferably, first and second fasteners 56, 58 each consists of a combination of a nylon bolt and a nylon wing nut.

Figure 3A:
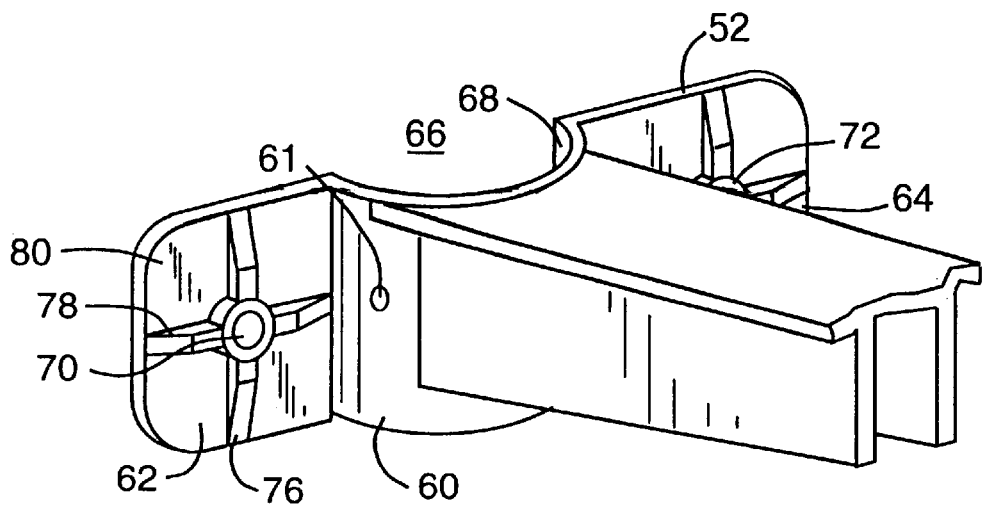
FIG. 3A is a perspective view of the proximal end of the horizontal double-beam-flange having an integral bracket-half of a clamping means according to a first embodiment of the present invention.

Referring to FIG. 3A integral bracket-half 52 consists of semi-cylindrical section 60 and first and second ear flanges 62, 64. Semi-cylindrical section 60 forms semi-cylindrical cavity 66 for receiving a structural member of a portable chair such as, for example, a chair leg, in contact with curved face 68. First and second ear flanges 62, 64 extend from opposite sides of semi-cylindrical section 60 and contain, respectively, first and second apertures 70, 72 for receiving, respectively, first and second fasteners 56, 58. Optionally, first and second ear flanges may have reinforcement ridges, such as vertical and horizontal reinforcement ridges 76, 78 protruding from their outer surfaces, such as from first ear flange outer surface 80, to provide the ear flange with additional stiffness.

Optionally, semi-cylindrical portion 60 may be supplied with one or more attachment holes, such as attachment holes 61, 63, best seen in FIG. 2, through which a fastener may be passed to fasten the integral body portion 15 directly to a structural member of a portable chair either with or without the use of mating bracket-half 54. Preferably, at least two such attachment holes are provided for such a purpose and are located in a symmetrical arrangement on either side of horizontal double-beam-flange member 22. A fastener, such as a bolt, screw, rivet or other suitable fastener known to those skilled in the art, may be passed through each attachment hole and into or through a structural member of the portable chair so as to securely fasten the integral body portion 12 to the structural member.

Figure 3B:
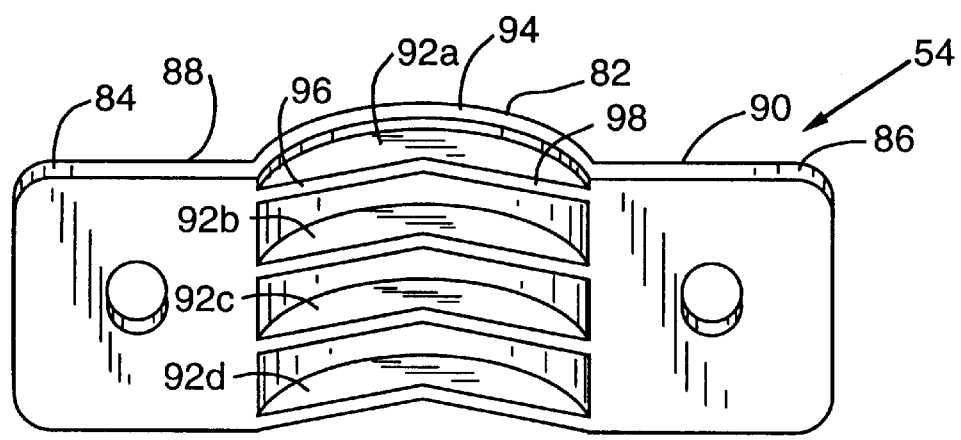
FIG. 3B is a perspective view of a mating bracket-half of a clamping means according to a first embodiment of the present invention.
Figure 3C:
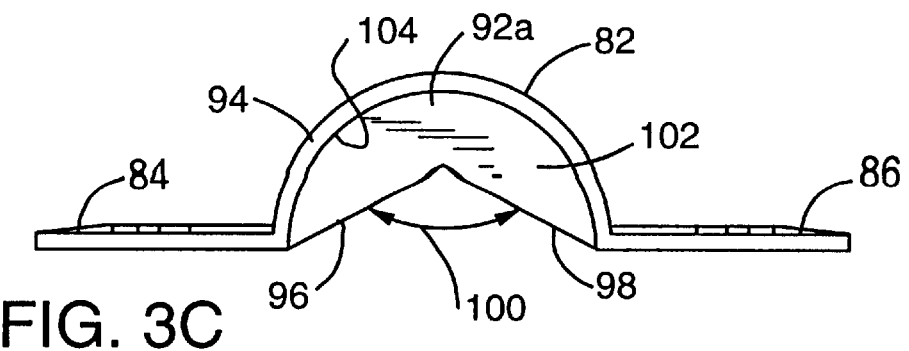
FIG. 3C is a top view of a mating bracket-half of a clamping means according to a first embodiment of the present invention.

Referring to FIGS. 3B and 3C, mating bracket-half 54 is an injection-molded polypropylene integral component consisting of a ribbed semi-cylindrical portion 82 and third and fourth ear flanges 84, 86. Third and fourth ear flanges 84, 86 extend from opposite sides of ribbed semi-cylindrical portion 82. Optionally, third and fourth ear flanges 84, 86 may have reinforcement ridges analogous to reinforcement ridges 76, 78 protruding from their outer surfaces 88, 90, respectively, to provide these ear flanges with additional stiffness.

Ribbed semi-cylindrical portion 82 contains curved section 94 and four spatially separated integral angled ribs, 92a–d. Each angled rib has a first and second contact face which intersect each other at an included angle of about 120 degrees along a plane vertically bisecting ribbed semi-cylindrical portion 82. For example, angled rib 92a has first and second contact faces 96, 98 intersecting each other at included angle 100 which is about 120 degrees. Each angled rib also has a web section, e.g. web section 102 of angled rib 92a, extending radially inward from the inner surface 104 of curved section 94. In service, when clamping means 14 is clamped to a structural member of a portable chair to support holder 10, the contact surfaces of the angled ribs, e.g. contact surfaces 96, 98 make gripping contact with the surface of the structural member.

Figure 4:
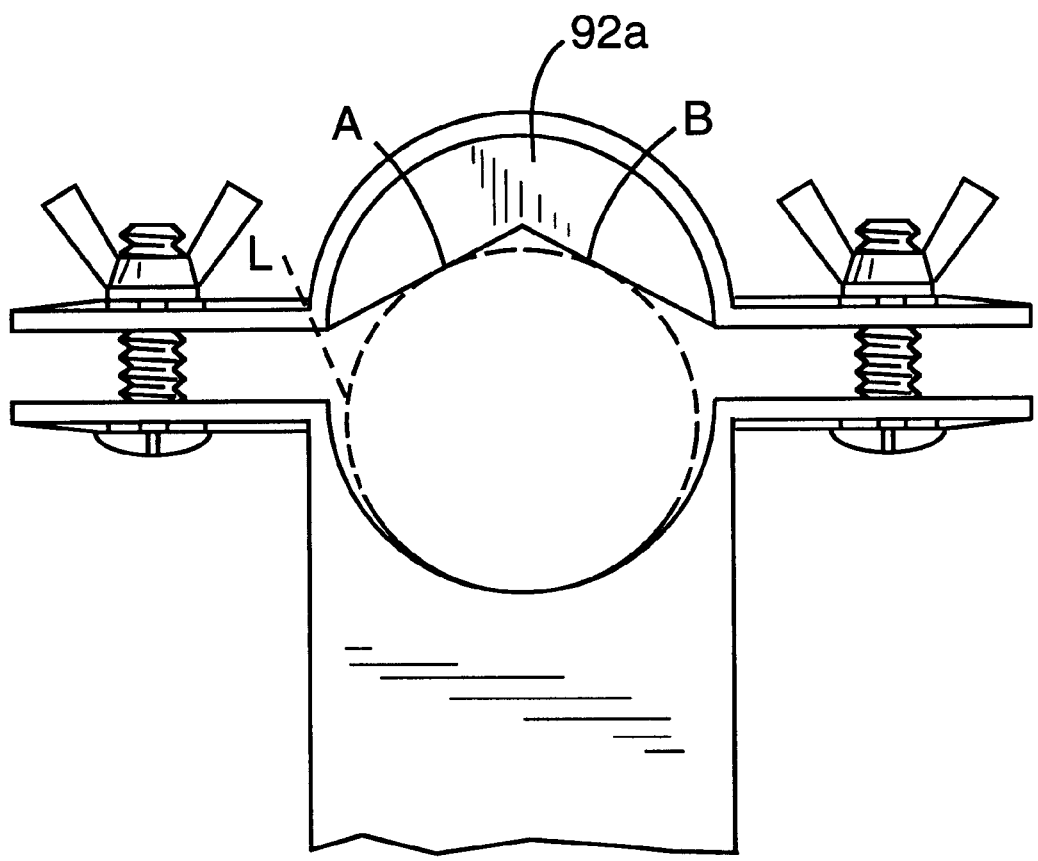
FIG. 4 is a top view of a clamping means according to a first embodiment of the present invention in clamping contact with a structural member of a portable chair.

The inventors have surprisingly discovered that a clamping means having four angled ribs configured in the manner described for angled ribs 92a–d has superior clamping ability over other clamping means, including those having a different number of ribs, for clamping holder 12 to cylindrical chair legs having diameters of between about ⅝ and about 1 inches. FIG. 4 shows a top view of holder 10 clamped by means of clamping means 14 to cylindrical chair leg L. As illustrated in FIG. 4, the angled rib configuration of the present invention causes each angled rib, e.g. angled rib 92a, to make positive contact at two discrete points, e.g. points A and B, along the surface of the cylindrical leg causing a slight elastic indentation of the cylindrical chair leg at each of these contact points thereby providing a mechanical resistance to holder 10 sliding down the cylindrical chair leg even when holder 10 is loaded with a fall container.

The first embodiment of the present invention is easy to use. To attach the holder to a portable chair, the integral bracket-half is placed against a structural member of the portable chair, for example, a chair leg, so as to receive the structural member into the integral bracket-half's semi-cylindrical section. The mating bracket-half is placed on the other side of the structural member opposite the integral bracket-half and then the first and second fasteners are employed to bring the two bracket halves into clamping contact with the structural member. A container may then be removably placed into the annular band of the holder so that the container's bottom rests upon the top surface of the horizontal flange. The holder may be detached from the chair by reversing the attachment steps.

Figure 5:
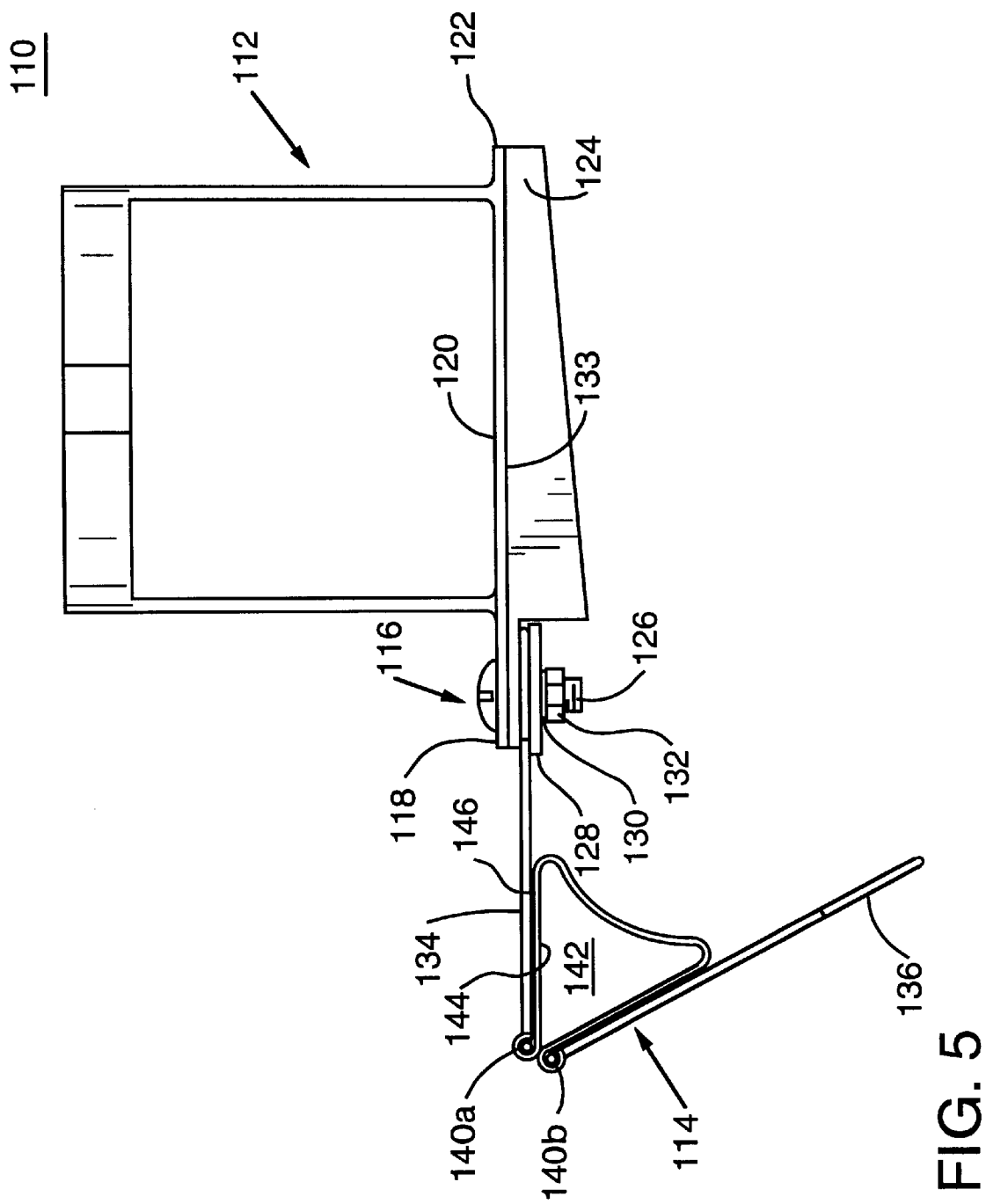
FIG. 5 is a side view of a second embodiment of the present invention.

A second embodiment of the present invention is illustrated in FIG. 5. This embodiment of the present invention is adapted to be attached to a planar horizontal structural member of a portable chair, for example, without limitation, the arm of a plastic lawn chair.

In this embodiment, second holder 110 consists of alternate integral body portion 112, alternate clamping means 114, and attachment fastener 116. Alternate integral body portion 112 of this embodiment is identical to integral body portion 12 of the first embodiment of the present invention except that alternate integral body portion 112 does not include an integral bracket-half but instead is adapted to have alternate clamping means 114 attached to proximal end 118 of alternate horizontal double-beam-flange 120 by way of attachment fastener 116. Therefore, in this second embodiment of the present invention, alternate horizontal flange member 122 extends beyond the two beams, e.g. alternate first beam 124, of alternate horizontal double-beam-flange member 120 at the proximal end 118 of alternate horizontal double-beam-flange member 120. Also, alternate horizontal flange member 122 is provided with a receiving aperture near proximal end 118 for receiving attachment fastener 116. The attachment fastener is a mechanical fastener which may be a bolt, a rivet or any other type of mechanical fastener known to one skilled in the art.

As shown in FIG. 5, attachment fastener 116 consists of bolt 126, flat washer 128, lock washer 130, and nut 132. Spring clamp upper handle 134 of alternate clamping means 114 is tightly sandwiched between bottom surface 133 of alternate horizontal flange 122 and flat washer 128 thereby mechanically affixing alternate clamping means 114 to alternate integral body portion 112 in an orientation for the clamping means receive a planar horizontal member of a portable chair. Where attachment fastener 116 contains metallic parts which are susceptible to aqueous corrosion, fastener 116 may be coated with a corrosion-resistant paint, preferably a rust-proof paint.

Alternate clamping means 114 is a spring clip clamp consisting of spring clamp upper and lower handles 134, 136 and spring member 138. Alternate holder 110 may be attached to a portable chair by squeezing upper and lower clamp handles 134, 136 to spread apart lips 140a–b of spring member 138, inserting a portion of a planar horizontal member of the portable chair, e.g. a portion of the arm of a plastic lawn chair, into throat 142 of spring member 138 so that the bottom surface 144 of spring member upper leg 146 rests upon the top surface of the inserted horizontal chair member and then releasing upper and lower handles 134, 136 to bring lips 140a–b into clamping contact with the inserted horizontal chair member. When alternate holder 110 is sized to hold a conventional beverage can having a 12 fluid ounce capacity, a size 10 binder clip available from S. P. Richards Co., Atlanta, Ga., may be used as alternate clamping means 114. Preferably, alternate clamping means 114 is either resistant to aqueous corrosion or made resistant by coating it with a corrosion-resistant paint, for example, without limitation, a rust-proofing paint.

The integral body portions and mating bracket halves according to the present invention may be injection molded using commercially available grades of polypropylene. Preferably, the polypropylene contains a strengthening agent, such as calcium, to impart greater stiffness to the holder. Also, the polypropylene may contain additives such as coloring agents to color the polypropylene, for example, without limitation, blue, white, etc., and sun blocking agents to preserve the quality of the holder.

Having described presently preferred embodiments of the present invention, it is to be understood that the present invention may be otherwise embodied within the scope of the appended claims. Thus, while only a few embodiments of the present invention have been shown and described, it will be obvious to those skilled in the art that many changes and modifications may be made thereunto without departing from the spirit and scope of the present invention as described in the appended claims.

What is claimed is:

1. A holder for a hand-size container for use in conjunction with a portable chair, the holder consisting of:
  a) an integral body portion consisting of an annular band having an inside diameter sized to receive a hand-held container; first and second arcuate legs; and a horizontal double-beam-flange member having a top surface, a proximal end, and a distal end; wherein the first and second arcuate legs depend downwardly from the annular band to spatially separate the annular band from the horizontal double-beam-flange member, and wherein the first arcuate leg intersects the top surface of the horizontal flange member adjacent to the distal end of the horizontal double-beam-flange member and the second arcuate leg intersects the top surface of the horizontal double-beam-flange member at a preselected distance from the proximal end of the horizontal double-beam-flange member such that the annular band, the first and second arcuate legs, and a portion of the top surface of the horizontal double-beam-flange member located between the first and second arcuate legs cooperate to hold a hand-sized container; and
  b) a clamping means for removably attaching the holder to a portable chair, wherein the clamping means is affixed to the proximal end of the horizontal double-beam-flange member, said clamping means consisting of:
    i) a first bracket-half consisting of a first semi-cylindrical section and first and second ear flanges; wherein the first and second ear flanges extend from the first semi-cylindrical section, and wherein each of the first and second ear flanges has an aperture for receiving a fastener, and wherein the first semi-cylindrical section has a semi-cylindrical cavity for receiving a structural member of a portable chair, and wherein the first bracket-half is integral to the horizontal double-beam-flange;
    ii) a second bracket-half consisting of a second semi-cylindrical section and third and fourth ear flanges; wherein the third and fourth ear flanges extend from the second semi-cylindrical section, and wherein each of the third and fourth ear flanges has an aperture for receiving a fastener, and wherein the second cylindrical section has four spatially separated angled ribs for engaging a surface of a structural member of a portable chair, and wherein each of the four angled ribs has a first and second planar contact surface, the first and second planar contact surfaces of each angled rib intersecting each other at an included angle of about 120 degrees; and
    ii) a first and second fastener;
  wherein the first and second fasteners cooperate with the apertures of the first, second, third, and fourth ear flanges to hold the first bracket-half and the second bracket-half opposingly in clamping contact with a structural member of a portable chair.

* * * * *